C. P. MARYE.
METHOD OF AND MEANS FOR CUTTING SCREW THREADS.
APPLICATION FILED DEC. 17, 1917.
1,382,662.
Patented June 28, 1921.
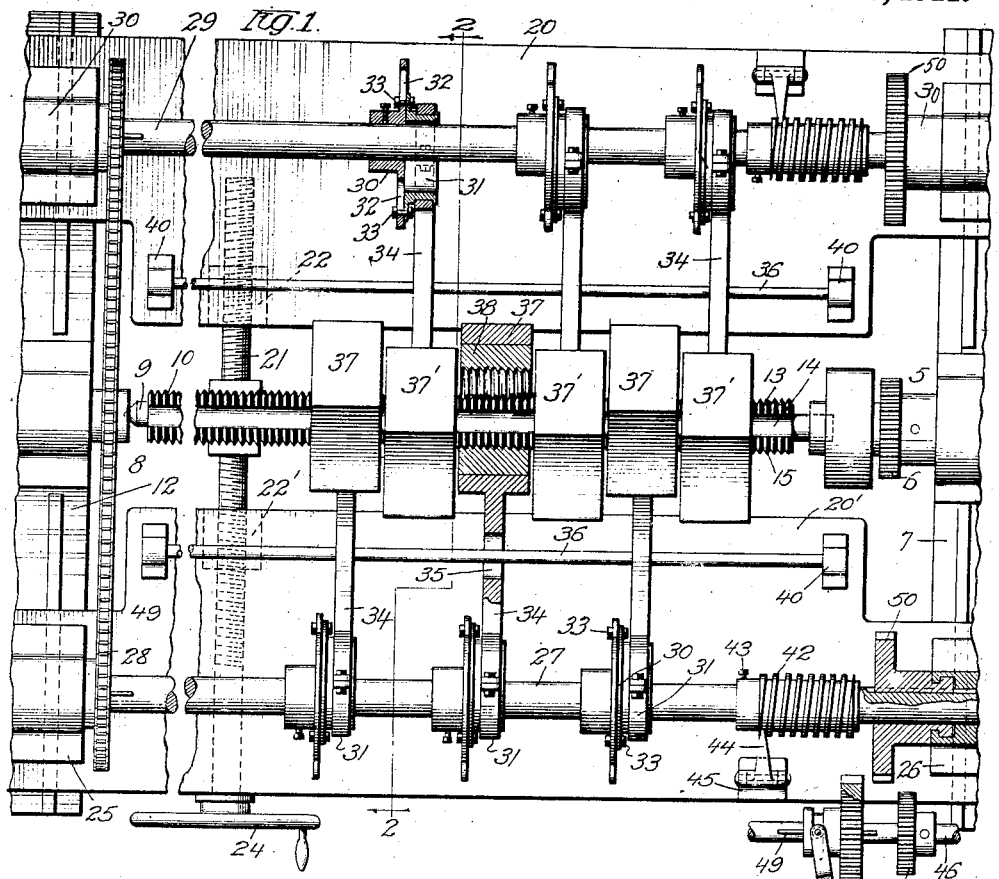
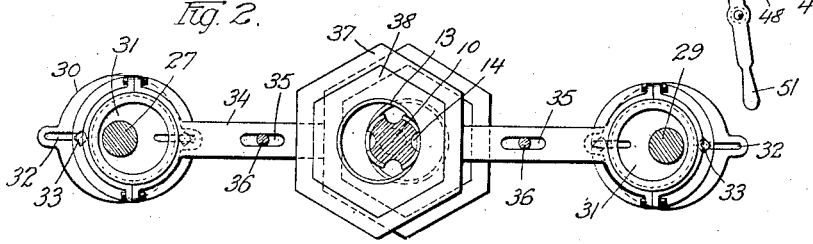

UNITED STATES PATENT OFFICE.

CLIFFORD P. MARYE, OF CHICAGO, ILLINOIS.

METHOD OF AND MEANS FOR CUTTING SCREW-THREADS.

1,382,662. Specification of Letters Patent. Patented June 28, 1921.

Application filed December 17, 1917. Serial No. 207,397.

*To all whom it may concern:*

Be it known that I, CLIFFORD P. MARYE, a citizen of the United States, residing at Chicago, in the county of Cook and State of Illinois, have invented certain new and useful Improvements in Methods of and Means for Cutting Screw-Threads, of which the following is a specification.

My invention relates to improvements in methods of and means for cutting screw threads on objects to be threaded.

One of the objects of my invention is to provide a new method of operation, whereby a milling cutter having concentric parallel thread cutting projections, and the object upon which threads are to be cut or milled are moved with relation to each other, one about the axis of the other, so that one cyclic movement about the axis is sufficient to complete the threads in or on the objects, without respect to length of the threaded parts thereof.

Another object of my invention is to axially progress the object and the miller to determine the pitch of the threads at the same time that the object is being moved around the cutting edges of the milling tool, or vice versa.

A further object of my invention is to cut threads in or on objects, in the manner described, with the objects axially arranged about the cutter, in a manner in which alternate objects constitute separate groups, and present the objects, of the respective groups, on opposite side of the axis of the milling cutter, to thereby maintain the latter in axial alinement during the thread cutting or milling operation.

Still another object of my invention is to provide a machine whereby my invention may quickly, expeditiously and economically be carried into effect.

Other, further and more specific objects of my invention will become readily apparent, to persons skilled in the art, from a consideration of the following description when taken in conjunction with the drawings, wherein:—

Figure 1 is a plan view of the simplest form of the machine.

Fig. 2 is a section, taken on line 2—2 of Fig. 1.

In all the views the same reference characters are employed to indicate similar parts.

Heretofore when threads have been milled upon objects by a rotating high speed milling cutter, both the objects and the miller have been rotated. When this has been done, not more than one nut has been threaded at a time. In carrying my invention into effect, I, preferably, arrange a number of objects, such as nut blanks to be threaded, in two or more groups, with alternate nuts presented to different sides of the cutter. When there are two groups of nuts, the respective groups are presented to a relatively long milling cutter on opposite sides thereof, whereby to hold the cutter in true axial alinement during the milling operation and I then, preferably, move said groups of nuts about said miller in such harmony that the cutting operation is constantly being performed, on the respective groups of nuts, bolts, or the like on opposite sides of the axis of the cutter. Instead of rotating the nuts or the like I may bodily move them about the cutter so that in one cyclic movement the threading operation is completed in the entire number of nuts.

In milling threads in nuts, the milling cutter must necessarily be smaller in diameter than the bore of the nut blanks, and if a number of nuts are to be threaded simultaneously, by such a long, slim and elastic cutter the thread in the nuts, when presented to one side only of the cutter, will not be uniform, because the cutter, near its middle part, will bear away from its work, owing to its inherent elasticity and therefore the threads made by this part of the cutter will not be so deep or perfect as those made at or near the ends of the cutter. I therefore arrange the nuts in a plurality of groups and present them to the cutter so that the pressure against the cutter on opposite sides of its axis will be substantially balanced and hence there will be no material lateral pressure on the cutter to bend it out of true axial alinement.

In the drawings I have illustrated rather schematically, a machine for carrying my method into effect. A head stock 5 supporting a spindle driven by a gear wheel 6 is mounted on a base 7 and at the opposite end a tail stock 8, to receive the end 9 of the milling cutter 10 is mounted upon a base 12. The milling cutter 10 is in many respects similar to an ordinary milling cutter and in general shape is something like a tap having projecting cutting edges 13, on either side of longitudinally extending grooves 14. In this particular case the cutter is provided with four cutting edges and the cutting edges are not spirally arranged as in a tap. Parallel thread like cutters 15, separated the distance that the threads are to be separated in the object operated upon, extend from end to end of the cutter. Instead of these edges 15 being spirally disposed, they are concentrically disposed in parallel planes.

Base plates 20 and 20' are mounted upon either side and rest upon and are movably guided by the base members 11 and 12.

A right and left hand screw 21 is secured to the base members 20 and 20', by screw threaded nuts 22 and 22', so that when the wheel 24 is rotated, the base members 20 and 20' may be made to approach each other or to recede from each other, guided at their ends upon the slides 11 and 12, respectively. Mounted in bearings 25 and 26 on the base member 20 or 20', is a shaft 27. A sprocket and chain connection 28 drives the shaft 29, which latter is mounted in bearings 30 and 31 on the base member 20. Secured to the shaft 27, and likewise to the shaft 29, are a series of eccentric supporting plates 30, carrying adjustable eccentrics 31. The throw of the eccentrics may each be adjusted by moving the eccentric on the respective plate 30, by bolts 33 passing through slots 32. When the eccentric has been moved to the position desired, it is secured in place by the bolts 33. An eccentric arm 34 extending from the strap 34' is provided with a slot 35 which contains a pivot rod 36. The outer end of the arm 34 carries a nut receptacle 37 in which are placed nuts 38 to be threaded, or it may have means to engage and hold other objects to be threaded. All of the eccentrics shown, their straps and nut holding means correspond with the description given for one.

My invention includes any means for holding the nuts, or other objects to be threaded, and other forms of construction in which such devices may quickly be moved into position and taken from the machine. No effort is made in this particular embodiment to provide such refinements. These are reserved for another application in which the specific devices, arrangements and coöperation of particular parts are to be described and claimed.

The pivot rod 36 which passes through the slot 35 of the respective eccentric arm, is mounted upon pillars 40, secured to the base 20 and 20'. A threaded sleeve 42 is secured to the shaft 27 by a set screw 43, or otherwise. The threads on this sleeve correspond in pitch to the pitch of the threads to be cut in the nuts 38. A bodily stationary detent 44 is pivoted to a stationary part 45, secured on the base 20, and may be pivotally moved from engagement with the nut, when it is necessary to return the shaft 27 to its axial position shown in Fig. 1. The detent may then be rotated on its base into the position shown in Fig. 1 in engagement with the left hand end of the threaded sleeve 42. By this arrangement the shaft 27, and the parts carried thereby, are moved longitudinally of the milling cutter 10 in accordance with the pitch of the screw thread of the sleeve 42.

46 is a driving shaft carrying a driving gear wheel 47 and provided with a sliding gear wheel 48, that is adapted to be driven by the shaft, by means of the spline and feather arrangement 49. The gear wheel 48 meshes with the gear 50 when it is moved axially of the shaft 46 by means of a handle 51. It will be noted that the nut holders 37 constitute one group and the nut holders 37' constitute another group. The first group of nut holders present the inner surfaces of the nuts to the miller on one side of the axis of the miller and the nut holders 37' present the respective nuts to the miller on the opposite side. By this means the milling tool 10 will be held in fixed alinement, whatever its length, and while the nuts are thus being constantly presented to the milling tool in a uniformly continuous manner, the cutting operation of the tool, with reference to the respective groups of nuts, is not changed.

The eccentric arm 34 is pivoted on the rod 36 and as the eccentric is moved around the shaft 27, in the same manner the nuts 38 are moved around the milling cutter 10, so that the inner surfaces of the nuts will be brought consecutively into contact with the cutting surfaces of the miller. When it is necessary to adjust the machine, for nuts having larger or smaller diameters, it is only required that the throw of eccentric be varied in the manner heretofore explained.

In the operation of the machine, after the nuts are placed in the respective holders, the milling cutter 10, being rotated at a relatively high speed, say about 1500 revolutions per minute, the surfaces of the nuts are presented to the miller by turning the screw 24. This will bring the shafts 27 and 29 closer to the milling tool 10, until the threads have been cut in the portion of the nuts then presented to the tool. After this has been done, the lever 51 is moved so that the gear wheel 48 is brought into contact with the gear wheel 50, whereupon the shafts 27 and 29 are rotated in the proper respective directions. The power is applied to the shaft 27 by means of the gear wheel 47 and the shaft 29 is rotated by means of the chain and sprocket connection 28 from the shaft 27.

As soon as the shafts 27 and 29 begin to rotate, the detents 44 engage the threaded sleeves 42, there being a threaded sleeve on each one of the shafts 29 and a corresponding detent, so that the shafts 27 and 29 are immediately moved in an axial direction toward the left. This will move the nuts 38 to be threaded, in a similar direction, and will give the necessary pitch to the threads cut by the miller 10. After the nuts have been moved once around the milling tool, the thread will have been completed in each and every one of the nuts, whereupon the nuts are removed and the shafts are returned to their former positions.

While I have shown two groups of nuts having three nuts in each group, it is manifest that a larger number of groups may be employed and a greater number of nuts in each group may be included. It is only necessary that the stress against one side of the milling tool should be substantially balanced by the stress on the other side, so as to maintain the tool in proper alinement during the thread cutting operation, and while I have shown the milling cutter driven from one end, it is manifest that if the torsional strain is too great when thus driven, that it may be driven from both ends or at as many intermediate points as desirable.

Having described my invention, what I claim is:—

1. The method of producing screw threads in or on an object to be threaded which consists in providing a milling tool rotatable on a stationary axis; rotating said tool at a relatively high speed and coincidentally moving a plurality of objects to be threaded about the axis of the tool in contact therewith and relatively moving the tool and objects in an axial direction.

2. A machine for coincidentally milling threads in or on a plurality of objects to be threaded, having independent means for holding the objects; milling means for cutting the threads; means for relatively moving the objects and milling means toward each other and means for relatively moving the objects and milling means axially to generate the threads.

3. A machine for coincidentally milling threads in or on a plurality of objects to be threaded, having independent means for holding the objects; milling means for cutting the threads; independent means for relatively moving the milling means and objects laterally toward and from each other; means to rotate the milling means; means to independently move the objects about the axis of the milling means; and means to relatively move the objects and milling means axially to generate the threads in or on the objects.

4. A machine of the character described comprising a relatively long thread-cutting milling-tool having a series of thread-cutting edges in adjacent parallel diametric planes; means for holding a series of objects to be threaded thereby so that selected objects will contact the tool at all times on opposite sides of its axis to maintain the tool in axial alinement and means for moving each series of objects around the axis of the tool, in contact therewith, and means for relatively moving said tool and objects axially to control the pitch of the threads to be cut.

5. A machine for producing screw threads in nuts having in combination a relatively long rotatable milling tool; means for moving a plurality of nuts to be threaded around the axis of the tool in contact therewith and means for holding said nuts arranged in alternate sequence in two groups, the nuts of one group contacting the tool at all times on a side thereof substantially opposite to the side which the nuts of the other group contact, whereby the nuts of one group provide a backing for the tool while cutting the nuts of the other group to prevent deflection of the tool.

6. A machine of the character described comprising a relatively long thread-cutting milling-tool having a series of thread-cutting edges in adjacent parallel diametric planes; means for holding a series of objects to be threaded thereby, so that selected or alternate objects will contact the tool at all times on opposite sides of its axis to maintain the tool in axial alinement; means for moving each series of objects around the axis of the tool in contact therewith; means to adjust the object-moving means to vary the scope of movement of said objects to compensate change of diameter of said objects, and means for relatively moving said tool and objects axially to control the pitch of the threads to be cut by said tool.

In testimony whereof I hereunto set my hand.

CLIFFORD P. MARYE.